United States Patent [19]
Cook

[11] Patent Number: 6,098,572
[45] Date of Patent: Aug. 8, 2000

[54] ANIMAL TWITCH

[76] Inventor: James O. Cook, 1955 Springfield Rd., Lebanon, Ky. 40033

[21] Appl. No.: 09/167,239

[22] Filed: Oct. 6, 1998

[51] Int. Cl.[7] .................................................. A01K 15/04
[52] U.S. Cl. .......................................... 119/802; 119/803
[58] Field of Search .................... 119/802, 801, 119/800, 803, 866; 43/85, 86, 87

[56] References Cited

U.S. PATENT DOCUMENTS

| | | |
|---|---|---|
| 745,323 | 12/1903 | Carns . |
| 1,201,560 | 10/1916 | Conn, Jr. . |
| 1,243,118 | 10/1917 | Trivigino . |
| 1,257,899 | 2/1918 | McCall . |
| 1,297,468 | 3/1919 | Holt . |
| 1,569,496 | 1/1926 | Johnson . |
| 1,661,064 | 2/1928 | Blaser . |
| 1,850,255 | 3/1932 | Amble . |
| 1,883,598 | 10/1932 | Dahl . |
| 2,170,442 | 6/1939 | Banholzer . |
| 2,499,511 | 3/1950 | Koger . |
| 3,747,569 | 7/1973 | Hannon . |
| 4,252,085 | 2/1981 | Burker . |
| 4,506,472 | 3/1985 | Barman ........................................ 43/87 |
| 5,088,449 | 2/1992 | Lamb, Sr. et al. ...................... 119/802 |

*Primary Examiner*—Peter M. Poon
*Assistant Examiner*—Yvonne R. Abbott
*Attorney, Agent, or Firm*—Scott R. Cox

[57] ABSTRACT

An animal twitch (10) including a flexible loop (20) secured to an incremental retracting bar (12) contained within a casing (16) which is activated by a grip handle (30). The grip handle (30), when activated, incrementally pulls the retracting bar (12) downward within the casing (16) and reduces the size of the opening of the flexible loop (20). By pulling on a release bar (46) the size of the opening of the flexible loop (20) can be enlarged.

19 Claims, 4 Drawing Sheets

ANIMAL TWITCH

FIELD OF INVENTION

This invention relates to devices for restraining the movement of animals. More particularly, it relates to an incrementally adjustable equine twitch.

BACKGROUND

Twitches are devices that are utilized to control the movement of horses. They are used with horses during a number of different procedures, such as shoeing, veterinary procedures or the like.

Twitches are well known and generally include a flexible looped cord secured to a handle. Conventionally, the loop is twisted tightly about a portion of the animal's lip for restraint. One difficulty with conventional twitches is that they often require both hands of one individual to utilize them effectively.

Conventional equine twitches, as shown in U.S. Pat. No. 1,201,560, include a slidable rod (10) which is pulled to tighten the loop.

U.S. Pat. No. 1,096,420 also discloses an equine twitch, wherein the loop is rotated by a crank (14). Another type of rotatable equine twitch, which utilizes a threaded screw (15), is shown in U.S. Pat. No. 1,257,899. Other equine twitches are disclosed in U.S. Pat. Nos. 2,170,442, 1,243,118, 3,747, 569 and 4,252,085.

While all of these equine twitches can be useful in controlling the movement of a horse, they generally require the use of both hands of the individual utilizing them because the loop must be twisted to tighten it around the horse's lip.

Accordingly, it is an object of the invention to disclose an improved equine twitch.

It is a further object of the invention to disclose an equine twitch which can be utilized with a single hand.

It is a still further object of the invention to disclose an equine twitch which can be tightened mechanically, without rotating the twitch mechanism.

It is a still further object of the invention to disclose an incrementally adjustable equine twitch.

It is a further object of the invention to disclose an equine twitch whose loop can be tightened securely about a portion of the horse's lip and maintained in that position until released.

These and other aspects of the invention can be provided by the equine twitch which is disclosed by the present invention.

SUMMARY OF INVENTION

The present invention includes an improved equine twitch which contains an incremental retracting bar, a flexible loop secured to one end of the incremental retracting bar, a handle assembly, through which the retracting bar can be incrementally retracted, a retracting mechanism for incrementally retracting the retracting bar contained within the handle assembly, and a release bar associated with the handle assembly and retracting mechanism for releasing the pressure on the retracting bar.

DETAILED DESCRIPTION OF A PREFERRED EMBODIMENT

Figure 1:
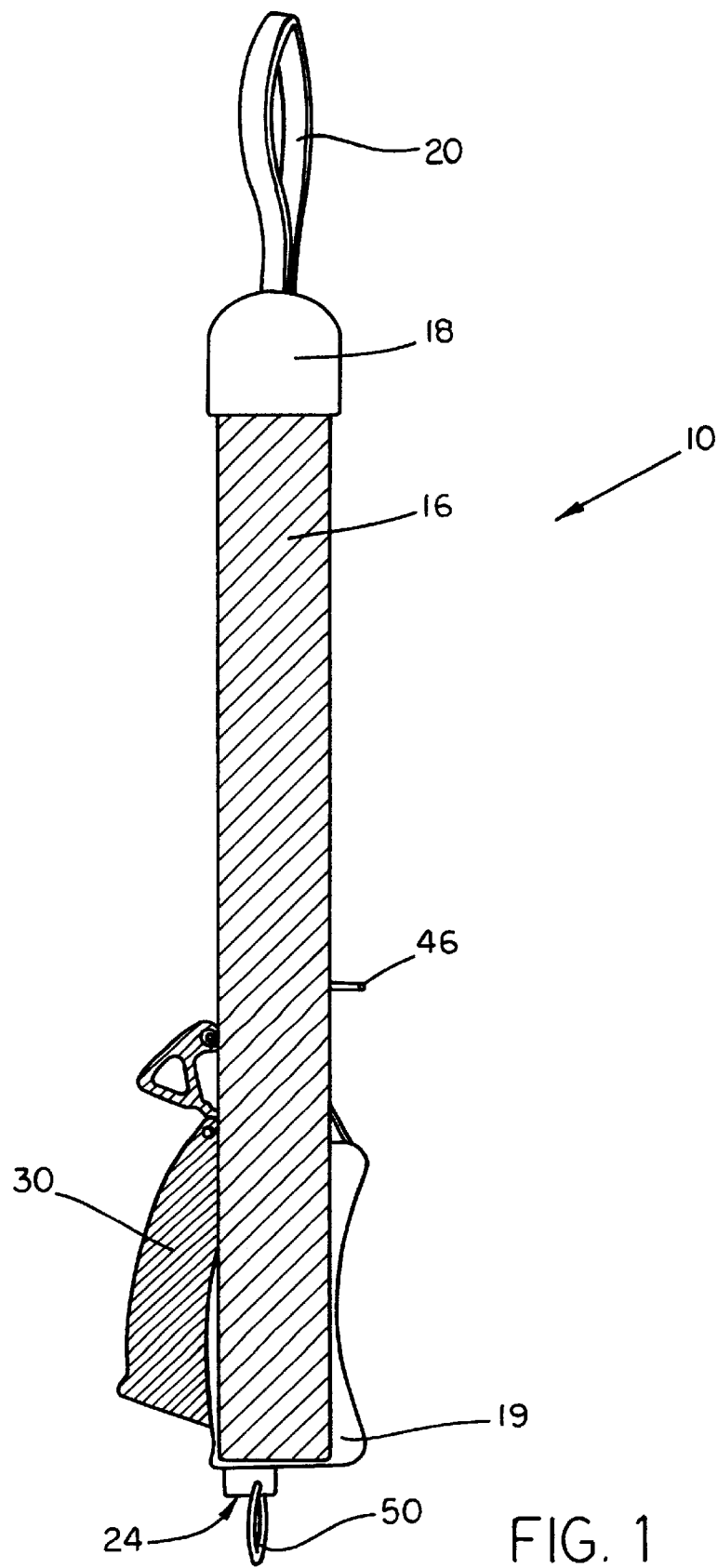
FIG. 1 is a side view of the animal twitch.
Figure 2:
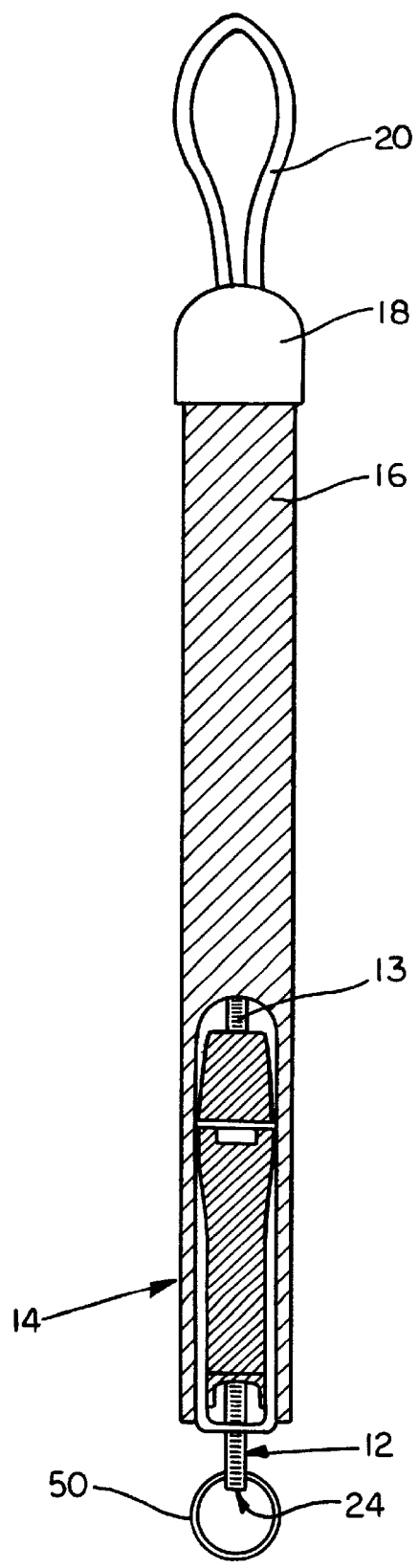
FIG. 2 is a top view of the animal twitch.
Figure 3:
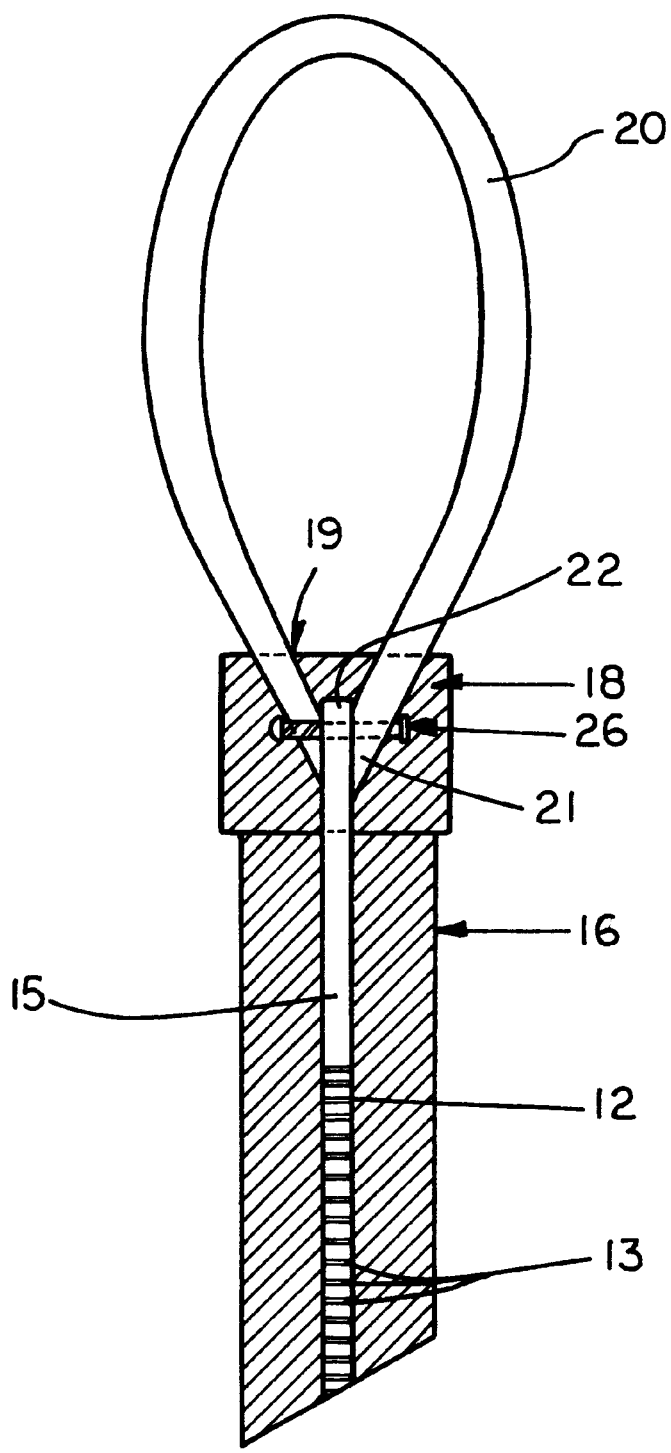
FIG. 3 is a cutaway top view of the end of the equine twitch containing the flexible loop.
Figure 4:
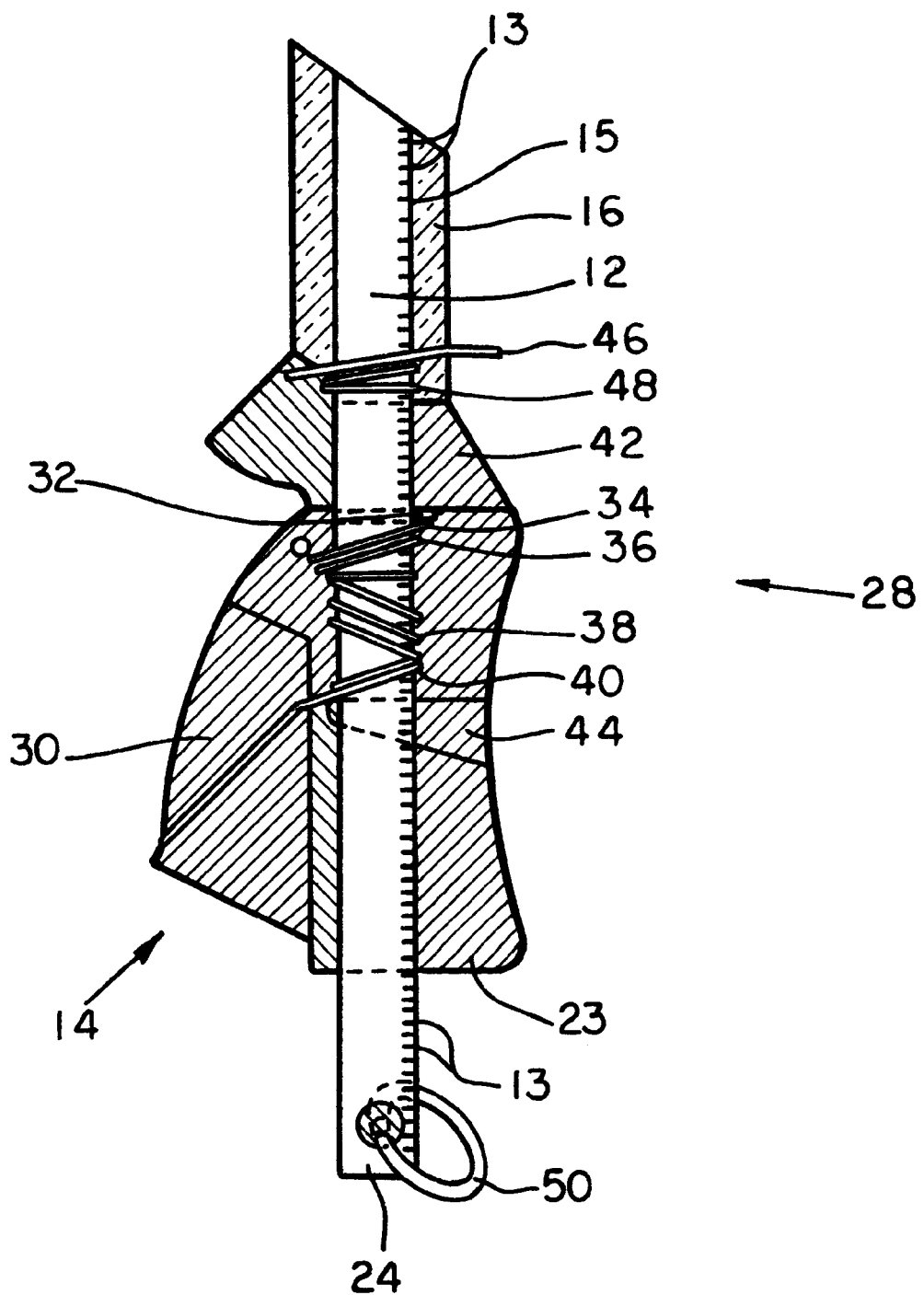
FIG. 4 is a cutaway side view of the end of the equine twitch containing the handle assembly.

The animal twitch (10) of the present invention includes a notched, retracting bar (12), partially contained within a handle assembly (14), which handle assembly (14) is secured to a casing (16), as shown in FIGS. 1, 2, 3 and 4. At one end (19) of the casing (16) is an end cap (18) which surrounds that end (19) of the casing (16), as shown in FIG. 3. The handle assembly (14) is secured to the opposite end (23) of the casing (16), as shown in FIG. 4. The retracting bar (12) runs from the end cap (18) through the casing (16) and the handle assembly (14) out the opposite end (23) of the equine twitch (10) and is preferably notched on its upper edge (15) with notches (13), as shown in FIGS. 3 and 4.

Secured to one end (22) of the retracting bar (12) is a flexible loop (20), as shown in FIG. 3. The flexible loop (20) can be made of any type of flexible material, such as rope, thick twine, or even a chain. The material should be sturdy as it is secured to the lip of the horse being restrained by the twitch (10). The ends (21) of the flexible loop (20) are secured to this end (22) of the retracting bar (12) by any conventional securing system, including the use of a bolt (26) passing through the ends (21) of the flexible loop (20) and through this end (22) of the retracting bar (12).

The end cap (18) contains a pair of openings in the casing (16) through which the flexible loop (20) passes as the retracting bar (12) is drawn through the casing (16) away from the end cap (18). By pulling the retracting bar (12) through the casing (16) away from the end cap (18), the size of the flexible loop (20) decreases, thus tightening it in place around the horse's nose.

The handle assembly (14) is secured at the opposite end of the casing (16) from the end cap (18) and may be an extension of the casing (16), as shown in FIG. 4. The handle assembly (14) includes a system for retracting the retracting bar (12) through the casing (16) away from the end cap (18). Any mechanism which pulls the retracting bar (12) away from the end cap (18) within the casing (16) and holds it in that position is covered by the present invention, as the goal of the invention is to provide a mechanism that reduces the size of the flexible loop (20) and holds it in that position so that it can be tightened around the horse without requiring the equine twitch (10) to be twisted.

In one preferred embodiment, this mechanism for retracting the retracting bar (12) incrementally away from the end cap (18) is a retracting mechanism (28). The retracting mechanism (28) includes a grip handle bar (32), which is preferably an integral part of a grip handle (30), which grip handle bar (32) surrounds the retracting bar (12). The retracting mechanism (28) also includes a lever bar (34), a friction bar (36), a spring (38), and a spring support bar (40). Secured to the opposite side of the handle assembly (14) from the grip handle (30) is a support structure (42) which supports the grip handle (30). Extending downward from the support structure (42) around the retracting bar (12) is a support structure bar (44). Contained between the grip handle support bar (32) and the support structure bar (44) and around the retracting bar (12) are the lever bar (34), friction bar (36), spring (38), and spring support bar (40).

The retracting bar (12) is notched with notches (13) on its upper edge (15) substantially down its entire length. An inside surface of the friction bar (36) catches on the notches (13) of the retracting bar (12) as the retracting bar (12) moves incrementally away from the end cap (18) and prevents further horizontal movement of the retracting bar (12) away from the end cap (18). When the grip handle (30) is squeezed, it places horizontal pressure on the grip handle support bar (32) which then exerts an incremental horizontal pressure against the lever bar (34) and the friction bar (36). The inner edge of the friction bar (36) catches on the notches (13) of the retracting bar (12), and when the friction bar (36) moves, it pulls the retracting bar (12) away from the end cap (18) of the casing (16). This retracting movement of the retracting bar (12) reduces the size of the opening in the flexible loop (20).

Distal from the grip handle support bar (32), preferably is a releasing mechanism, preferably comprising a release bar (46) supported by a release bar spring (48), as shown in FIG. 4. The release bar (36) also surrounds the retracting bar (12) with its inner edge resting against the upper notched edge (15) of the retracting bar (12). The release bar spring (48) places horizontal pressure on the release bar (46) forcing it distally forward along the retracting bar (12). Because the release bar (46) is angled forward around the retracting bar (12), when the retracting bar (12) is pulled horizontally away from the notches (13) of the retracting bar (12), its movement is not constrained within the handle assembly (14) by the release bar (46). However, when the release bar (46) is angled forward, the retracting bar (12) may not move forward in the handle assembly (14) toward the end cap (18) because of the interaction between the inner surface of the release bar (46) and the notches (13) in the retracting bar (12). When the release bar (46) is pulled backward toward the handle assembly (14), this eliminates the interaction between the release bar (46) and the notches (13) of the retracting bar (12), thus, permitting the retracting bar (12) to freely move horizontally.

Regardless of the interaction of the release bar (46) with the retracting bar (12), the one-way movement of the retracting bar (12) away from the end cap (18) is not impeded by the release bar (46). To assist in this rapid one-way movement of the retracting bar (12) away from the end cap (18) of the casing (16), preferably a retracting element, such as a retracting ring (50), is secured to a second end (24) of the retracting bar (12). By pulling on this retracting ring (50), the retracting bar (12) slides rapidly away from the end cap (18) of the casing (16). By pulling the retracting bar (12) away from the end cap (18), the flexible loop (20) is reduced in size, to allow for variable operator hand size and/or horse nose size.

In operation, the flexible loop (20) is extended fully from the end cap (18) of the casing (16) by releasing the release bar (46) and pulling the flexible loop (20) out from the casing (16). The flexible loop (20) is then placed in position around the lip of the horse to be held. To reduce the size of the flexible loop (20) incrementally and tighten it around the lip of the horse, the grip handle (30) is repeatedly squeezed against the support structure (42). With this pressure, the lever bar (34) and friction bar (36) pull incrementally the retracting bar (12) downward within the casing (16) resulting in a reduced size of the flexible loop (20). For rapid movement of the retracting bar (12) within the casing (16) to reduce rapidly the size of the flexible loop (20), the retracting ring (50) is pulled. In order to release this pressure on the flexible loop (20), horizontal pressure is placed on the release bar (46) toward the handle assembly (14) end of the twitch (10), which moves the release bar (46) away from interaction with the retracting bar (12). Once the release bar (46) is released from interacting with the retracting bar (12), the retracting bar (12) releases due to the flexibility of the horse's nose, resulting in an enlargement of the size of the opening in the flexible loop (20) to release the horse from the flexible loop (20).

One of the advantages of this invention is that the flexible loop (20) can be tightened incrementally around the horse's lip using only one hand, without requiring the equine twitch (10) to be twisted. The pressure created by the flexible loop (20) can also be removed using one hand by pulling on the release bar (46) and pulling the animal twitch (10) away from the horse.

It will be apparent from the foregoing that while particular forms of the invention have been illustrated and described, various modifications can be made without departing from the spirit and scope of the invention.

What is claimed is:

1. An animal twitch comprising
   a handle assembly;
   an incremental retracting bar interacting with the handle assembly;
   a flexible loop secured at one end of the incremental retracting bar;
   a retracting mechanism comprised of elements which place direct pressure on, and engage with the retracting bar to impede movement for incrementally retracting the retracting bar within the handle assembly; and
   a release bar, which interacts with the retracting bar to remove pressure placed on the retracting bar by the retracting mechanism.

2. The animal twitch of claim 1 wherein the incremental retracting bar is a notched bar.

3. The animal twitch of claim 1 wherein the release mechanism comprises a spring loaded friction bar.

4. The animal twitch of claim 1 wherein the flexible loop is secured to the retractable bar by a bolt passing through one end of the flexible loop and the retracting bar.

5. The animal twitch of claim 1 further comprising a quick retracting mechanism.

6. The animal twitch of claim 1 further comprising a levered grip handle secured to the handle assembly.

7. An animal twitch comprising
   a handle assembly;
   an incremental retracting bar interacting with the handle assembly wherein the handle assembly comprises a levered spring bar assembly;
   a flexible loop secured at one end of the incremental retracting bar;
   a retracting mechanism comprised of elements which place direct pressure on, and engage with the retracting bar to impede movement for incrementally retracting the retracting bar within the handle assembly; and
   a release bar, which interacts with the retracting bar to remove pressure placed on the retracting bar by the retracting mechanism.

8. The animal twitch of claim 7 wherein the incremental retracting bar is a notched bar.

9. The animal twitch of claim 7 wherein the release mechanism comprises a spring loaded friction bar.

10. The animal twitch of claim 7 wherein the flexible loop is secured to the retractable bar by a bolt passing through one end of the flexible loop and the retracting bar.

11. The animal twitch of claim 7 further comprising a quick retracting mechanism.

12. The animal twitch of claim 7 further comprising a levered grip handle secured to the handle assembly.

13. The animal twitch of claim 7 further comprising a casing, substantially surrounding the incremental retracting bar, and an end cap on the casing.

14. An animal twitch comprising
 a handle assembly;
 an incremental retracting bar interacting with the handle assembly;
 a flexible loop secured at one end of the incremental retracting bar;
 a retracting mechanism comprised of elements which place direct pressure on, and engage with the retracting bar to impede movement for incrementally retracting the retracting bar within the handle assembly;
 a release bar, which interacts with the retracting bar to remove pressure placed on the retracting bar by the retracting mechanism and
 a casing, substantially surrounding the incremental retracting bar, with an end cap on the casing.

15. The animal twitch of claim 14 wherein the incremental retracting bar is a notched bar.

16. The animal twitch of claim 14 wherein the release mechanism comprises a spring loaded friction bar.

17. The animal twitch of claim 14 wherein the flexible loop is secured to the retractable bar by a bolt passing through one end of the flexible loop and the retracting bar.

18. The animal twitch of claim 14 further comprising a quick retracting mechanism.

19. The animal twitch of claim 14 further comprising a levered grip handle secured to the handle assembly.

* * * * *